(12) United States Patent
Tjeenk Willink

(10) Patent No.: US 6,962,199 B1
(45) Date of Patent: *Nov. 8, 2005

(54) METHOD FOR REMOVING CONDENSABLES FROM A NATURAL GAS STREAM, AT A WELLHEAD, DOWNSTREAM OF THE WELLHEAD CHOKE

(75) Inventor: Cornelis Antonie Tjeenk Willink, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,654

(22) PCT Filed: Dec. 29, 1999

(86) PCT No.: PCT/EP99/10498

§ 371 (c)(1),
(2), (4) Date: Jun. 28, 2001

(87) PCT Pub. No.: WO00/40834

PCT Pub. Date: Jul. 13, 2000

(51) Int. Cl.⁷ .............................................. E21B 43/38
(52) U.S. Cl. .................... 166/265; 166/177.2; 95/258; 96/238; 96/389
(58) Field of Search ................................ 166/265, 266, 166/302, 177.1, 177.2, 267; 95/29, 32, 34, 258, 259, 269; 96/389, 236, 238, 188, 205; 55/394, 396, 421, 462

(56) References Cited

U.S. PATENT DOCUMENTS

| | | | |
|---|---|---|---|
| 3,155,401 A | 11/1964 | Musolf | 285/18 |
| 3,185,181 A | 5/1965 | Demyan | 138/37 |
| 3,297,344 A | 1/1967 | Hanes | 285/141 |
| 3,559,373 A | 5/1968 | Garrett | 55/9 |
| 3,493,050 A | 2/1970 | Kelley et al. | 166/267 |
| 3,544,170 A | 12/1970 | Bowles | 302/28 |
| 3,599,400 A | 8/1971 | Orieux et al. | 55/203 |
| 3,616,596 A | 11/1971 | Campargue | 55/17 |

(Continued)

FOREIGN PATENT DOCUMENTS

| | | | |
|---|---|---|---|
| DE | 2243926 | 9/1972 | B01D/47/00 |
| DE | 10040015 A1 | 8/2000 | B01D/47/00 |
| EP | 0 496 128 | 7/1992 | B01D/53/24 |
| EP | 711903 B1 | 1/1999 | E21B/43/36 |
| EP | 1141520 B1 | 12/1999 | E21B/43/40 |
| GB | 1103130 | 2/1968 | B01D/45/16 |
| GB | 2037610 A | 7/1980 | B01D/59/50 |
| JP | 63165849 | 7/1988 | G03C/7/34 |

(Continued)

OTHER PUBLICATIONS

M. Betting et al. Supersonic Separator Apparatus and Method, U.S. Appl. No. 09/223,884, filed Dec. 31, 1998.

C. A. Tjeenk Willink et al., Supersonic Nozzle and Method for Forming Separable Particles, U.S. Appl. No. 09/223,888, filed Dec. 31, 1998.

*Primary Examiner*—William Neuder

(57) ABSTRACT

The present invention relates to a method for removing condensables from a natural gas stream, at a wellhead, downstream of the wellhead choke thereof. In accordance with the invention there is provided a method for removing condensables from a natural gas stream at a wellhead, the method comprising the steps of: (A) inducing the natural gas stream to flow at supersonic velocity through a conduit of a supersonic inertia separator and thereby causing the fluid to cool to a temperature that is below a temperature/pressure at which the condensables will begin to condense, forming separate droplets and/or particles; (B) separating the droplets and/or particles from the gas; and (C) collecting the gas from which the condensables have been removed, wherein the supersonic inertia separator is part of the wellhead assembly downstream of the wellhead choke. There is also provided a device for removing said condensables from said natural gas that is part of the wellhead assembly downstream of the choke, a wellhead assembly comprising said device.

12 Claims, 4 Drawing Sheets

U.S. PATENT DOCUMENTS

| | | | |
|---|---|---|---|
| 3,626,665 A | 12/1971 | Fenn et al. | 55/17 |
| 3,720,263 A | 3/1973 | Murphy et al. | 166/303 |
| 3,725,271 A | 4/1973 | Giannotti | 210/65 |
| 3,997,008 A | 6/1975 | Canfield | 166/267 |
| 3,892,070 A | 7/1975 | Bose | 60/279 |
| 3,894,851 A | 7/1975 | Gorman | 55/94 |
| 4,102,401 A | 7/1978 | Erbstoesser | 166/284 |
| 4,141,701 A | 2/1979 | Ewan et al. | 95/217 |
| 4,148,735 A | 4/1979 | Laval, Jr. | |
| 4,194,718 A | 3/1980 | Baker et al. | 251/14 |
| 4,272,499 A | 6/1981 | Cason et al. | 423/243.8 |
| 4,292,050 A | 9/1981 | Linhardt et al. | 55/1 |
| 4,308,134 A | 12/1981 | Lilleker et al. | 209/732 |
| 4,531,584 A | 7/1985 | Ward | 166/265 |
| 4,541,845 A | 9/1985 | Michel-Kim | 55/17 |
| 4,606,557 A | 8/1986 | Coffey | 285/18 |
| 4,823,880 A | 4/1989 | Klatt | 166/373 |
| 4,898,235 A | 2/1990 | Enright | 166/64 |
| 5,261,242 A | 11/1993 | Lardinois | 62/11 |
| 5,333,684 A | 8/1994 | Walter et al. | 166/54 |
| 5,444,684 A | 8/1995 | Yanagi et al. | 369/44.28 |
| 5,682,759 A | 11/1997 | Hays | 62/402 |
| 5,713,416 A * | 2/1998 | Chatterji et al. | 166/263 |
| 5,794,697 A | 8/1998 | Wolflick et al. | 166/265 |
| 6,222,083 B1 * | 4/2001 | Colle | 585/15 |
| 6,237,691 B1 | 5/2001 | Kelley et al. | 166/370 |
| 6,280,502 B1 | 8/2001 | Van Veen et al. | 95/29 |
| 6,372,019 B1 | 4/2002 | Alferov et al. | 95/29 |
| 6,447,574 B1 | 9/2002 | Frier, Jr. et al. | 95/29 |
| 6,524,368 B2 * | 2/2003 | Betting et al. | 95/29 |
| 2002/0194988 A1 | 12/2002 | Betting et al. | 95/29 |
| 2003/0145724 A1 | 8/2003 | Betting et al. | 95/29 |

FOREIGN PATENT DOCUMENTS

| | | | |
|---|---|---|---|
| JP | 2-17921 | 1/1990 | B01D/53/24 |
| JP | 02 017921 | 1/1990 | B01D/53/24 |
| NL | 8901841 | 2/1991 | B01D/5/00 |
| SU | 593717 | 2/1976 | B01D/45/06 |
| SU | 1 172 540 | 3/1992 | A61B/71/00 |
| SU | 1 768 242 | 10/1992 | B01D/45/12 |
| SU | 1768242 | 10/1992 | B01D/45/12 |
| SU | 1768242 A1 | 10/1992 | B01D/45/12 |
| WO | 95/09970 | 4/1995 | E21B/43/38 |
| WO | 99/01194 | 1/1999 | B01D/53/24 |
| WO | 99 01194 | 1/1999 | B01D/53/24 |
| WO | 01/21286 A1 | 3/2001 | B01D/45/16 |

* cited by examiner

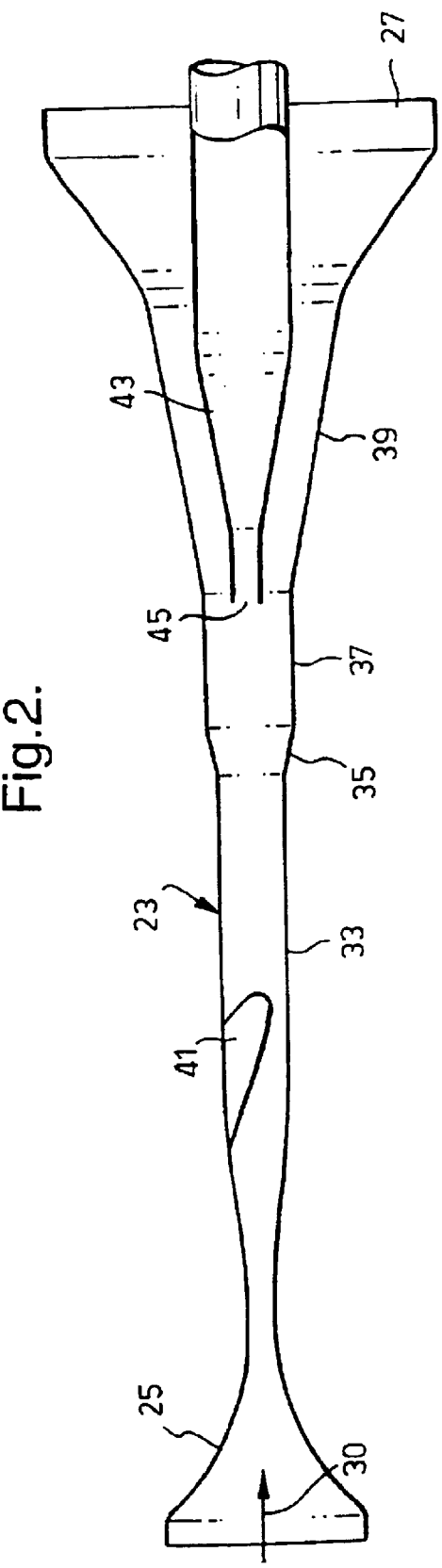

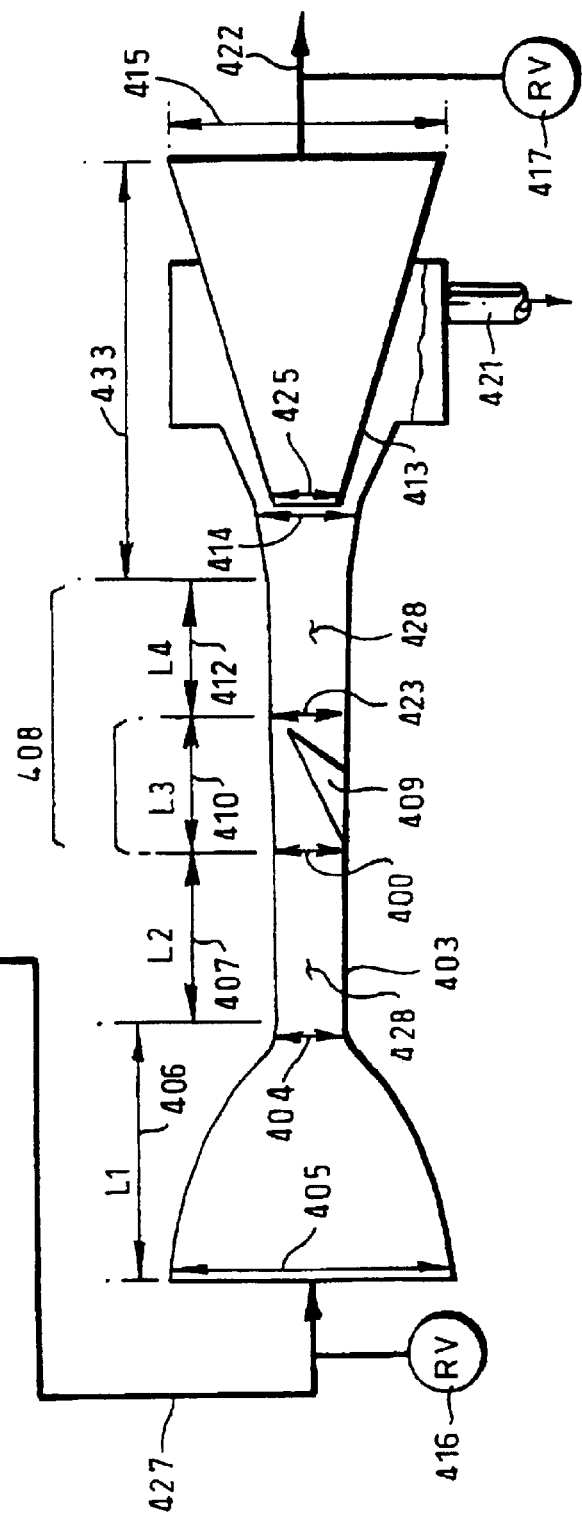
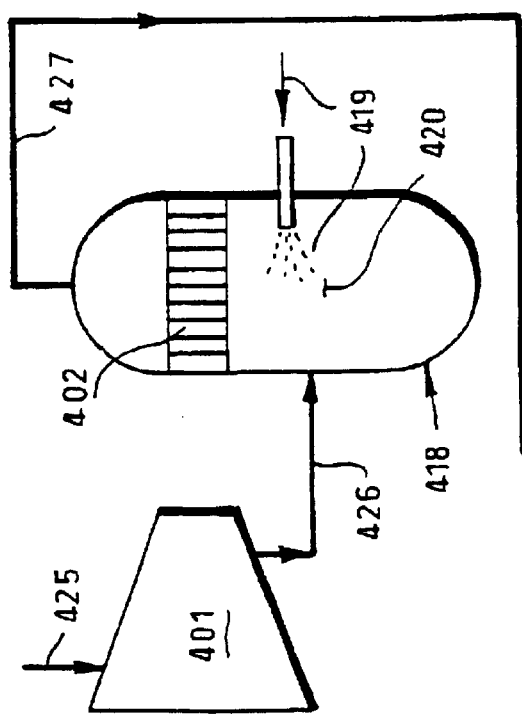
Fig. 4.

METHOD FOR REMOVING CONDENSABLES FROM A NATURAL GAS STREAM, AT A WELLHEAD, DOWNSTREAM OF THE WELLHEAD CHOKE

FIELD OF THE INVENTION

The present invention relates to a method for removing condensables from a natural gas stream, at a wellhead, downstream of the wellhead choke thereof; to a wellhead device for removing said condensables from said natural gas that is part of the wellhead assembly downstream of the choke, and to a wellhead assembly comprising said device.

BACKGROUND TO THE INVENTION

For background information relating to wellhead assemblies and chokes (or sometimes referred to as valves) thereof, intended to control the flow from the well, reference may be had to the following US patents:

| U.S. Pat. No. | Inventor | Title |
| --- | --- | --- |
| 3,155,401 | Musolf | Well Head Assembly |
| 3,297,344 | Hanes | Connectors For Well Parts |
| 4,194,718 | Baker et al | Choke |
| 4,102,401 | Erbstoesser | Well treatment fluid diversion with low density ball sealers |
| 4,606,557 | Coffey | Sub-sea Wellhead Connector |
| 4,898,235 | Enright | Wellhead apparatus for use with a plunger produced gas well having a shut-in timer, and method of use thereof |

Natural gas, produced from a subsurface or sub-sea gas producing formation (hereinafter subterranean formation), requires the separation of components that are normally liquid or that have relatively high condensation temperatures. These components, which are collectively referred to in the claims and the description with the expression "the condensables" include water, propane, butane, pentane, propylene, ethylene, acetylene and others such as carbon dioxide, hydrogen sulfide, nitrogen gas and the like. Typically, the gas stream is treated, on surface, downstream of a wellhead that is connected with a subterranean gas producing formation via a primary wellbore containing a tubing extending downhole from the wellhead.

Separators to remove water from gas as it is being produced are known, for example in U.S. Pat. No. 5,333,684. This device uses floating balls that float up and block a flowpath when a water level in the wellbore becomes high, and then as gas pressure builds, and forces the water level down, allowing production of gas that is free of liquid water. This device is only capable of keeping liquid water out of produced gas. It is not capable of neither removing water from the wellbore, nor from lowering the dew point temperature of the produced gas.

U.S. Pat. No. 5,794,697 also discloses a downhole separator for taking gas from a mixture of liquids and gas produced into a wellbore. This patent focuses on downhole compression of the gas and re-injection of the gas into a gas cap over the oil remaining in the formation. A separator is shown and described as a auger that imparts a swirling motion to the fluids, and then removal of the gas from the center of the swirl. This separator also does not lower the dew point temperature of the gas, but only separates existing phases.

European patent application 0711903 and U.S. Pat. No. 3,599,400 disclose centrifugal oil/gas separators in which the produced crude oil and natural gas are separated by centrifugal forces but in which the produced phases are not expanded so that these separators only separate existing oil and gas phases.

Separators that are effective to lower dew points of gases generally require complex equipment and instrumentation, such as refrigerated sponge oils or glycol absorbers. Such operations are generally too complex to be placed at wellheads such as sea floor wellheads, and too expensive to be place at individual wellheads in a gas producing field.

It would be desirable to have a dehydrator as part of the wellhead assembly, downstream of the wellhead choke that not only removes liquid water, but that lowers the dew point temperature of the produced gas, and is simple and inexpensive.

Numerous methods and devices exist for separating components from gaseous or other fluids. Examples of conventional separation device include distillation columns, filters and membranes, settling tanks, centrifuges, electrostatic precipitators, dryers, chillers, cyclones, vortex tube separators and adsorbers. In addition, various inertia separators have been described in the art, equipped with a supersonic nozzle.

JP-A-02,017,921 refers to the separation of a gaseous mixture through the use of supersonic flow. The device includes a swirler positioned upstream of a supersonic nozzle. The swirling fluid stream then passes through an axially symmetric expansion nozzle to form fine particles. The swirl is maintained over a lengthy axial distance, creating a large pressure drop.

U.S. Pat. No. 3,559,373 refers to a supersonic flow separator including a high pressure gas inlet, a rectangular-shaped throat, and a U-shaped rectangular-cross sectional channel. The channel includes an outer curved permeable wall. A gas stream is provided to the gas inlet at subsonic speeds. The gas converges through the throat and expands into the channel, increasing the velocity to supersonic speed. The expansion of the flow in the supersonic region results in droplet coalescence and the larger droplets pass through the outer permeable wall and are collected in a chamber.

UK-A-1,103,130 describes a method and device for the separation of components of a predominantly gaseous stream, wherein the steam is accelerated to supersonic speed and subjected to an intense electric field in combination with an intense sound. Natural gas from a well connected via a line may be treated in this manner.

EP-A-0,496,128 refers to a method and device for separating a gas from a gas mixture. The device includes a cylinder which converges to a nozzle and then diverges into a swirl zone. Gas enters an inlet port of the cylinder at subsonic speeds and flows through a converging section of the nozzle. The flow expands out of the converging section into the diverging section of the cylinder at supersonic velocity. A pair of deltoid plates impart a swirl to the supersonic flow. The combination of the supersonic velocities and the swirl assist in condensing and separating a condensed component from the gaseous components of the flow stream. An outlet pipe is positioned centrally within the cylinder to allow discharge of the gaseous components of the flow stream at supersonic velocity. The liquid components continue on through a second diverging section, which drops the velocity to subsonic, and through a fan, ultimately exiting the cylinder through a second outlet.

WO 99/01194 describes a similar method and corresponding device for removing a selected gaseous component from a stream of fluid containing a plurality of gaseous components. This device is equipped with a shock flow inducer downstream of the collecting zone so as to decrease the axial velocity of the stream to subsonic velocity. Application of a shock wave in this manner results in a more efficient separation of the formed particles.

These references describe various supersonic inertia separators. However, none describe or hint at their use as part of a wellhead assembly downstream of a wellhead choke.

SUMMARY OF THE INVENTION

The present invention relates to a method for removing condensables from a natural gas stream, at a wellhead, downstream of the wellhead choke thereof.

In accordance with the invention there is provided a method for removing condensables from a natural gas stream, the method comprising the steps of:

(A) inducing the natural gas stream to flow at supersonic velocity through a conduit of a supersonic inertia separator and thereby causing the fluid to cool to a temperature that is below a temperature/pressure at which the condensables will begin to condense, forming separate droplets and/or particles;

(B) separating the droplets and/or particles from the gas; and (C) collecting the gas from which the condensables have been removed, wherein the supersonic inertia separator is located in the vicinity of the wellhead of a natural gas production well for the separation of condensables from the natural gas stream produced through said well.

There is also provided a device for removing said condensables from said natural gas that is located in the vicinity of the wellhead and a wellhead assembly comprising said device.

DETAILED DESCRIPTION OF THE INVENTION

Any of the inertia separators equipped with a supersonic nozzle described herein before can be used. The supersonic inertia separator that is preferred, is of the type described in EP-A-0,496,128, i.e., wherein the supersonic stream containing droplets and/or particles is forced into a swirling motion, thereby causing the droplets and/or particles to flow to a radially outer section of a collecting zone in the stream, followed by the extraction of these droplets and/or particles in a supersonic collection zone.

In a preferred embodiment of the present invention, a shock wave caused by transition from supersonic to subsonic flow occurs upstream of the separation of the condensables from the collecting zone. It was found that the separation efficiency is significantly improved if collection of the droplets and/or particles in the collecting zone takes place after the shock wave, i.e. in subsonic flow rather than in supersonic flow. This is believed to be because the shock wave dissipates a substantial amount of kinetic energy of the stream and thereby strongly reduces the axial component of the fluid velocity while the tangential component (caused by the swirl imparting means) remains substantially unchanged. As a result the density of the droplets and/or particles in the radially outer section of the collecting zone is significantly higher than elsewhere in the conduit where the flow is supersonic. It is believed that this effect is caused by the strongly reduced axial fluid velocity and thereby a reduced tendency of the particles to be entrained by a central "core" of the stream where the fluid flows at a higher axial velocity than nearer the wall of the conduit. Thus, in the subsonic flow regime the centrifugal forces acting on the condensed droplets and/or particles are not to a great extent counteracted by the entraining action of the central "core" of the stream. The droplets and/or particles are therefore allowed to agglomerate in the radially outer section of the collecting zone from which they are extracted.

Preferably the shock wave is created by inducing the stream of fluid to flow through a diffuser. A suitable diffuser is a supersonic diffuser. A diffuser may be, for example, a diverging volume, or a converging and then diverging volume.

In an advantageous embodiment, the collecting-zone is located adjacent the outlet end of the diffuser.

The present invention may be practiced in combination with other operations to effect drying of the fluid stream, or a separation of condensables from the inlet stream by other means to decrease the load on the separator of the present invention. Also, either of the stream containing the condensables from the collecting zone or the stream from which the condensables have been separated could be subjected to an additional separation step, for example, a dryer or separator.

The supersonic flow of the present invention also causes a rapid expansion, resulting in cooling of a compressible fluid stream. This cooling results in condensation of vapors to the extent that such cooling brings the temperature of the stream to a temperature below a dew point of the fluid stream.

Advantageously, any gaseous fraction separated from the radially outer section of the collecting zone can be recycled back to the inlet, preferably using an inductor to increase the pressure back to the pressure of the inlet stream.

Suitably the means for inducing the stream to flow at supersonic velocity comprises a Laval-type inlet of the conduit, wherein the smallest cross-sectional flow area of the diffuser is larger than the smallest cross-sectional flow area of the Laval-type inlet.

BRIEF DESCRIPTION OF THE FIGURES

FIG. 2 shows schematically a longitudinal cross-section of a second embodiment of the device useful in the practice of the present invention.

FIG. 4 shows schematically a device used to demonstrate the device useful in the practice of the present invention.

DESCRIPTION OF A PREFERRED EMBODIMENT

Figure 1:
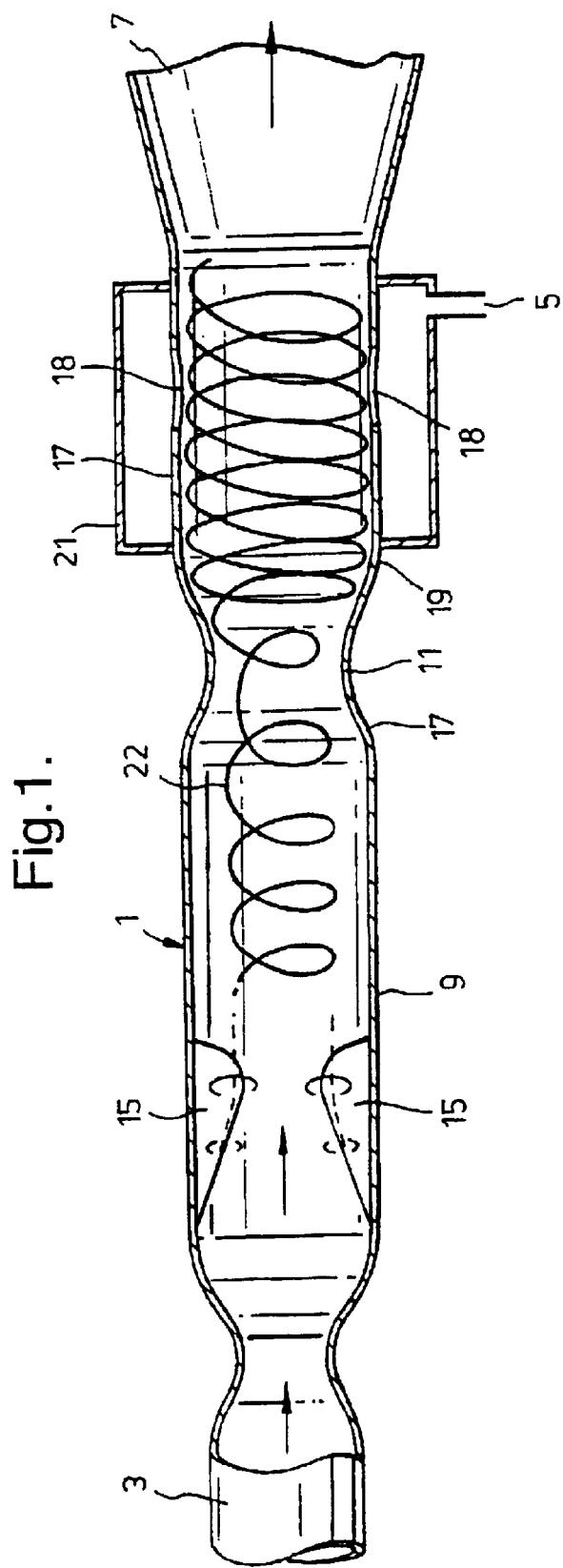
FIG. 1 shows schematically a longitudinal cross-section of a first embodiment of the separator useful in the practice of the present invention.

In FIG. 1 is shown a conduit in the form of an open-ended tubular housing 1 having a fluid inlet 3 at one end of the housing. A first outlet 5 for condensables laden fluid near the other end of the housing, and a second outlet 7 for substantially condensables-free fluid at the other end of the housing. The flow-direction in the device 1 is from the inlet 3 to the first and second outlets 5, 7. The inlet 3 is an acceleration section containing a Laval-type, having a longitudinal cross-section of converging—diverging shape in the flow direction so as to induce a supersonic flow velocity to a fluid stream which is to flow into the housing via said inlet 3. The housing 1 is further provided with a primary cylindrical part 9 and a diffuser 11 whereby the primary cylindrical part 9 is located between the inlet 3 and the diffuser 11. One or more (for example, four) delta-shaped wings 15 project radially inward from the inner surface of the primary cylindrical part 9. Each wing 15 is arranged at a selected angle to the flow-direction in the housing so as to impart a swirling motion to fluid flowing at supersonic velocity through the primary cylindrical part 9 of the housing 1.

The diffuser 11 has a longitudinal section of converging - diverging shape in the flow direction, defining a diffuser inlet 17 and a diffuser outlet 19. The smallest cross-sectional flow area of the diffuser is larger than the smallest cross-sectional flow area of the Laval-type inlet 3.

The housing 1 further includes a secondary cylindrical part 17 having a larger flow area than the primary cylindrical part 9 and being arranged downstream the diffuser 11 in the form of a continuation of the diffuser 11. The secondary cylindrical part 17 is provided with longitudinal outlet slits 18 for liquid, which slits 18 are arranged at a suitable distance from the diffuser outlet 19.

An outlet chamber 21 encloses the secondary cylindrical part 17, and is provided with the aforementioned first outlet 5 for a stream of concentrated solid particles.

The secondary cylindrical part 17 debouches into the aforementioned second outlet 7 for substantially gas.

Normal operation of the device 1 is now explained.

A stream containing micron-sized solid particles is introduced into the Laval-type inlet 3. As the stream flows through the inlet 3, the stream is accelerated to supersonic velocity. As a result of the strongly increasing velocity of the stream, the temperature of the stream may decrease to below the condensation point of heavier gaseous components of the stream (for example, water vapors) which thereby condense to form a plurality of liquid particles. As the stream flows along the delta-shaped wings 15 a swirling motion is imparted to the stream (schematically indicated by spiral 22) so that the liquid particles become subjected to radially outward centrifugal forces. When the stream enters the diffuser 11 a shock wave is created near the downstream outlet 19 of the diffuser 11. The shock wave dissipates a substantial amount of kinetic energy of the stream, whereby mainly the axial component of the fluid velocity is decreased. As a result of the strongly decreased axial component of the fluid velocity, the central part of the stream (or "core") flows at a reduced axial velocity. This results in a reduced tendency of the condensed particles to be entrained by the central part of the stream flowing in the secondary cylindrical part 17. The condensed particles can therefore agglomerate in a radially outer section of a collecting zone of the stream in the secondary cylindrical part 17. The agglomerated particles form a layer of liquid which is extracted from the collecting zone via the outlet slits 18, the outlet chamber 21, and the first outlet 5 for substantially liquid.

The stream from which water has been removed (and any condensable vapors) is discharged through the second outlet 7 for substantially solids-free gas.

In FIG. 2 is shown a second embodiment of the device for carrying out the invention, the device having an open-ended tubular housing 23 with a Laval-type fluid inlet 25 at one end. A first outlet 27 for a stream containing liquids at the other end of the housing. The flow-direction for fluid in the device is indicated by arrow 30. The housing has, from the inlet 25 to the liquid outlet 27, a primary substantially cylindrical part 33, a diverging diffuser 35, a secondary cylindrical part 37 and a diverging part 39. A delta-shaped wing 41 projects radially inward in the primary cylindrical part 33, the wing 37 being arranged at a selected angle to the flow-direction in the housing so as to impart a swirling motion to fluid flowing at supersonic velocity through the housing 23. A tube-shaped second outlet 43 for substantially gas extends through the first outlet 27 coaxially into the housing, and has an inlet opening 45 at the downstream end of the secondary cylindrical part 37. The outlet 43 is internally provided with a straightened (not shown), e.g. a vane-type straightener, for transferring swirling flow of the gas into straight flow.

The delta-shaped wing is preferably a triangular profile shape, with a leading edge that is sloped to a wing tip.

Normal operation of the second embodiment is substantially similar to normal operation of the first embodiment. A supersonic swirling flow occurs in the primary cylindrical part 33, the shock wave occurs near the transition of the diffuser 35 to the secondary cylindrical part 37. Subsonic flow occurs in the secondary cylindrical part 37, the stream containing the solid particles and any condensed liquids is discharged through the first outlet 27. Dried gas is discharged through the second outlet 43 in which the swirling flow of the gas is transferred into straight flow by the straightener.

In the above detailed description, the housing, the primary cylindrical part, the diffuser and the secondary cylindrical part have a circular cross-section. However, any other suitable cross-section of each one of these items can be selected. Also, the primary and secondary parts can alternatively have a shape other than cylindrical, for example a frusto-conical shape. Further-more, the diffuser can have any other suitable shape, for example without a converging part (as shown in FIG. 2) especially for applications at lower supersonic fluid velocities.

Instead of each wing being arranged at a fixed angle relative to the axial direction of the housing, the wing can be arranged at an increasing angle in the direction of flow, preferably in combination with a spiraling shape of the wing. A similar result can be obtained by arranging flat wings along a path of increasing angle with respect to the axis of initial flow.

Furthermore, each wing can be provided with a raised wing-tip (also referred to as a winglet).

Instead of the diffuser having a diverging shape (FIG. 2), the diffuser alternatively has a diverging section followed by a converging section when seen in the flow direction. An advantage of such diverging—converging shaped diffuser is that less fluid temperature increase occurs in the diffuser.

Figure 3A:
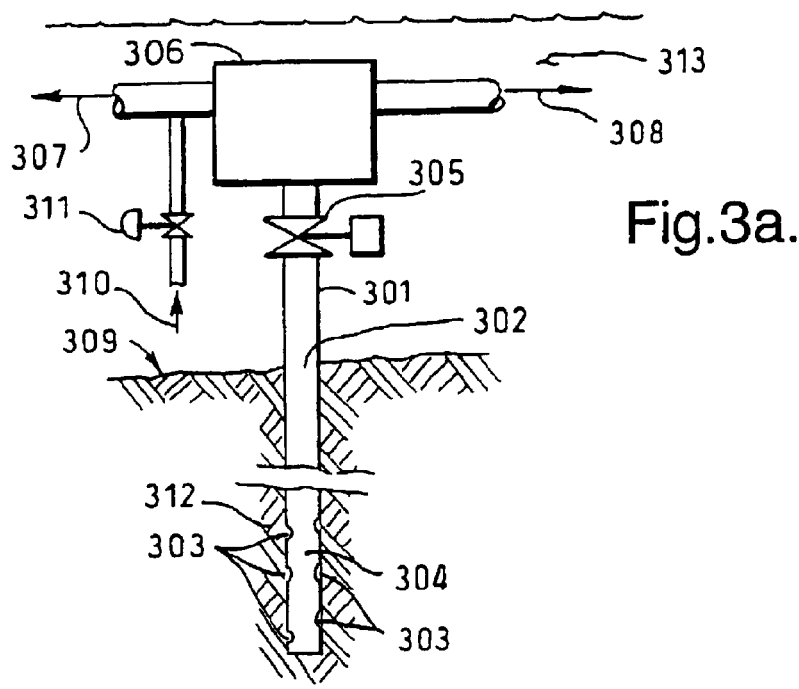
FIGS. 3A and 3B show schematically a device according to the present invention at a wellbore.

Referring now to FIG. 3A, a device of the present invention is shown schematically at a sub-sea wellhead. A sub-sea well 301, in a body of water 313 is shown with a casing 302, with perforations 303 providing communication from a formation 312 to the inside of the wellbore 304. Typical well head equipment 305 is schematically shown. The separator of the present invention 306 separates a mostly liquid stream 307 from a dried stream of vapors 308. Temperatures at the sea floor 309 approach freezing temperatures, and formation of hydrates along sea floor piping is therefore a serious concern. The present invention provides a simple, low maintenance and inexpensive dehydration system. The separated liquids may be provided with hydrate inhibition additive 310 through a controlled injection 311.

Figure 3B:
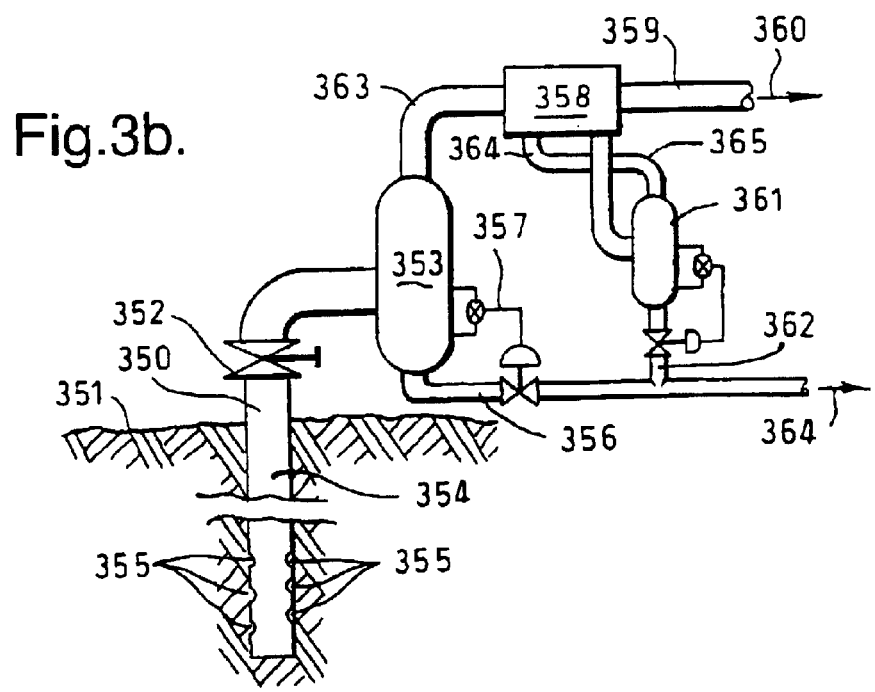

Referring now to FIG. 3B, another embodiment is shown, with a wellbore 350 located at a surface 351. The wellbore is cased with a casing 354 provided with perforations 355. Typical wellhead equipment may be provided 352. A liquid-vapor separator 353 is provided with a liquid outlet 356 and a level control system 357. A vapor outlet from the liquid-vapor separator 363 is routed to the dehydrator of the present invention 358. The vapors from the outlet 359 of the separator of the present invention is dry gas 360 having a dew point lower than the dew point of the produced gases. Liquid from the separator of the present invention 358 may contain vapors, which will be saturated, and are therefore preferably routed to a second vapor-liquid separator 361. The liquids from this second separator 362 can be combined with liquids from the first separator, or routed separately to surface equipment. Alternatively, liquids from the second separator may be re-injected into a formation for effective disposal. The liquids from the second separator may be pumped to a higher pressure reservoir, or flow by pressure available to a low pressure formation. The liquids from the second separator, if re-injection is desirable, may be collected and then re-injected, or re-injected into the wellbore from which the gas was produced.

Vapors from the second liquid-vapor separator 365 may be recycled through a venturi recompression nozzle into the inlet of the separator of the present invention.

The stream concentrated in water and condensable hydrocarbons 364 is preferably sufficiently concentrated in water vapor so that addition of components to prevent formation of hydrates is not needed. Even if hydrate inhibition is desirable, the amount of hydrate inhibition compound needed will be considerably reduced because of the need to treat only the smaller volume of fluid to be treated.

The swirl imparting means can be arranged at the inlet part of the conduit, instead of downstream the inlet part.

EXAMPLE

A test device for the present invention was prepared, and demonstrated for separating water vapor from air at ambient conditions. Obviously, in case the device is used subsurface, sub-sea or at the wellhead, different temperatures pressures and Mach numbers may apply. However, a skilled man will have no difficulty making the necessary adaptations. FIG. 4 is referred to for the general configuration of the device used. MDO9/TH1457PCT In this example the air 425 was pressurized to 140 KPa (1.4 bar (a)) by means of a blower 401 to provide pressurized air 426. After the blower the air was cooled to about 25 to 30° C. by fin cooler 402, located in a vessel 418, and water 419 was sprayed into the vapor space below the cooler 420 to ensure that the air was near water saturation (RV=90%). This water saturated air 427 was fed to the feed liquid-vapor separator 403 where the water was separated with a small amount of slip air into a wet stream 421, coming along with this water liquid stream and dried air 422.

In this example, the device was provided with tubular flow ducts although the same results can be achieved for rectangular or asymmetric duct cross sections. Therefore diameters of devices are mentioned and always refer to the inner diameter.

The typical inlet conditions are summarized below:

| 1. Mass flow rate | 1.2 kg/s |
|---|---|
| 2. Inlet pressure | 140 KPa (1400 mbar (a)) |
| 3. Inlet temperature | 25° C. |
| 4. Inlet humidity | 90% |

The device condensed water vapor, resulting in a mist flow containing large number of water droplet. The final temperature and pressure in the supersonic zone 428 were found to be −28° C. and 68 KPa (680 mbar (a)), resulting in a water vapor fraction that was negligibly small.

The nozzle throat diameter 404 was 70 mm. The inlet diameter 405 was 300 mm, although its value is not significant with respect to the working of the device. The nozzle outlet diameter 400 was 80 mm in order to obtain supersonic flow conditions; typically the corresponding Mach number, M=1.15.

The lengths of the nozzle are determined by the cooling speed, which for this case is 19000 K/s. Persons of ordinary skill in the art can determine pressure and temperature profiles for the flow through the device, and thus the cooling rate. The cooling speed determines the droplet size distribution. Lowering the value of the cooling speed results in larger average droplet sizes. The lengths of the nozzle were:

L1, 406:700 mm: from nozzle inlet to nozzle throat
L2, 407:800 mm: from nozzle throat to nozzle outlet In order to decrease frictional losses the wall roughness was small, preferably 1 micron or less.

Depending on the application any rigid material can be used for the nozzle device, as long as the before mentioned design parameters are respected.

The vortex tube 408 was connected between the nozzle outlet and the diffuser. In the vortex tube a wing-like, swirl imparting internal 409 was present. At the edge of this internal a vortex was created on the upper (low-pressure) side and shed from the plane, preferably at the trailing edge. The root cord of this wing-like plate was attached to the inner wall of the vortex tube.

The inlet diameter of the vortex tube 400 was 80 mm. In this case vortex tube was slightly conical; the diameter increased linearly to 84 mm (423) over a length of approximately the cord length of the wing.

After the conical section of the vortex tube 410, the vortex tube diameter was constantly 84 mm over a length were the droplets deposited on the inner wall (separation length). These two lengths were:

L3, 410:300 mm: from wing apex to wing trailing edge
L4, 412:300 mm: from wing trailing edge to diffuser The sizing of the wing internal depended on the preferred circulation or integral vorticity. This circulation is typical 16 $m^2$/s resulting from a wing cord length of 300 mm, a wing span at the trailing edge of 60 mm and at an incidence of the wing cord at the axis of the tube of 8°. The sweepback angle of the leading edge (from perpendicular to the flow) was 87° and the sweepback angle of the trailing edge was 40°. The edges of the wing were sharp. The plane of the wing was flat and its profile was extremely slender. The thickness of the wing was about 4 mm at the root. The wing was at an 8° angle to the axis of the tube.

In the drainage section withdrawal of liquids out of the vortex tube was achieved. The drainage section is not a sharp distinguished device but is an integral part of the vortex tube, by means of, for example, slits, porous materials, holes in the vortex tube walls; or, as shown in FIG. 4, is an integral part of the diffuser by means of a vortex finder 413 (co-axial duct). In this example, a vortex finder (co-axial duct) was placed centrally in the duct after the shock wave, which was present directly after the vortex tube in the first diffuser part 414.

The sizing of the vortex tube is dependent on the diameter ratio between diffuser diameter at that location 424 (90 mm at the inlet) and vortex finder inlet diameter at that point 425 (85 mm at the inlet). The cross-sectional area difference between the latter two influences the minimal flow, which is extracted from the main stream containing the liquids. In this case this minimal flow was 10% of the main flow i.e. 0.12 kg/s. The diffuser length 433 was 1500 mm.

In the diffuser the remaining kinetic energy in the flow is transformed to potential energy (increase of static pressure). It is desirable to avoid boundary layer separation, which can cause stall resulting in a low efficiency. Therefore the half divergence angle of the diffuser in the present test set-up should be preferably less then 5° as in this case 4° was used. The diffuser inlet diameter was the same as the vortex finder inlet diameter (85 mm). The outlet diameter 415 of the diffuser was 300 mm, and the dry air at this point was at about atmospheric pressure. The performance of this device was measured by two humidity sensors (capacitive principle: manufacturer 'Vaisala') one at the air inlet 416 and the other at the dried air outlet 417, both were corrected for temperature and pressure. The typical values of the inlet water fractions were 18–20 gram of water vapor per kg dry air. Typical values of the outlet water were 13–15 gram of water vapor per kg dry air. This can be expressed in separation efficiencies of about 25% of the water vapor in the inlet removed. This also corresponds to the separation of liquids condensed in the super sonic region, because most of the liquid water present in the inlet stream condenses at that point.

What is claimed is:

1. A method for removing condensables from a gas stream, the method comprising the steps of:
   (A) inducing the natural gas stream to flow at supersonic velocity through a conduit of a supersonic inertia separator and thereby causing the fluid to cool to a temperature that is below a temperature/pressure at which the condensables will begin to condense, forming separate droplets and/or particles;
   (B) separating the droplets and/or particles from the gas; and
   (C) collecting the gas from which the condensables have been removed, characterized in that the supersonic inertia separator is located in the vicinity of a gas production well for the separation of condensables from the natural gas stream produced through said well and wherein in step (B) a swirling motion is induced to the supersonic stream thereby causing the condensables to flow to a radially outer section of a collecting zone in the stream, followed by the subsonic or supersonic extraction of the condensables into an outlet stream from the radially outer section of the collecting zone, and wherein the swirling motion in imparted by a wing placed in the supersonic flow region.

2. The method of claim 1, further comprising the step of: creating a shock wave in the stream that is upstream of the collecting zone and downstream of the location where the swirling motion is imparted.

3. The method of claim, 2 wherein the shock wave is created by inducing the stream of fluid to flow through a diffuser.

4. The method of claim 1, further comprising adding a hydrate inhibition component to the outlet stream extracted from the radially outer section of the collecting zone.

5. A device for removing condensables from natural gas according to a method comprising the steps of: inducing the gas stream to flow at supersonic velocity through a conduit of a supersonic inertia separator and thereby casuing the fluid to cool to a temperature that is below a temperature/pressure at which the condensables will begin to condense, forming separate droplets and/or particles; separating the droplets and/or particles from the gas; and collecting the gas; and collecting the gas from which the condensables have been removed, characterized in that the supersonic inertia separator is located in the vicinity of a production well for the separation of condensables from the natural gas stream produced through said well, the device comprising:
   an acceleration section wherein gas is accelerated to a supersonic velocity;
   a swirl imparting section that imparts a swirling motion to the gas;
   a collection zone from which a gas stream containing reduced content of condensables is removed;
   a radially outer section of the collecting zone with a radially outer section from which the condensables can be collected, characterized in that the device is located in the vicinity of the wellhead of a natural gas production well and is designed for the separation of condensables from a natural gas stream produced through said well; and
   a shock wave initiator downstream of the swirl imparting section.

6. The device of claim 5 wherein the shock wave initiator is a diffuser, located so that the shock wave is upstream of the collecting zone.

7. The device of claim 6, wherein the acceleration section comprises a Laval-type inlet of the conduit, and wherein the smallest cross-sectional flow area of the diffuser is larger than the smallest cross-sectional flow area of the Laval-type inlet, and wherein the swirl imparting section that imparts a swirling motion to the stream comprises a wing device.

8. A wellhead assembly comprising a device as claimed in claim 5, downstream of the wellhead.

9. A wellhead assembly as claimed in claim 8, comprising a sub-sea wellhead.

10. The device of claim 5, wherein the radially outer section of the collecting-zone debouches into an annular first outlet for collecting a condensables enriched fluid stream and a central section of the collecting zone debouches into a tubular second outlet for collecting a condensables depleted fluid stream, characterized in that the tubular second outlet is a substantial formed by a substantially straight tubular which remains substantially co-axial to the annular first outlet along at least a substantial portion of the tubular's length.

11. The device of claim 10, wherein the annular first outlet has in downstream direction a cylindrical or diverging shape.

12. The device of claim 11, wherein the tubular second outlet has in downstream direction a cylindrical or diverging shape and provides a co-axial vortex finder duct within the annular first outlet.

* * * * *